United States Patent [19]

Baker

[11] 4,341,241

[45] Jul. 27, 1982

[54] POSITION INDICATING VALVE MEANS

[75] Inventor: Joseph W. Baker, Branchburg Township, Somerset County, N.J.

[73] Assignee: Brunswick Corporation, Skokie, Ill.

[21] Appl. No.: 198,365

[22] Filed: Oct. 20, 1980

[51] Int. Cl.³ .............................................. F16K 37/00
[52] U.S. Cl. ................................ 137/554; 137/625.65; 251/129
[58] Field of Search ........................... 137/554, 625.65; 310/251; 251/129

[56] References Cited

U.S. PATENT DOCUMENTS

| | | | |
|---|---|---|---|
| 3,946,285 | 3/1976 | Beery | 361/153 |
| 3,993,247 | 11/1976 | Tyler | 137/554 |
| 4,000,430 | 12/1976 | Bely et al. | 310/251 |
| 4,004,258 | 1/1977 | Arnold | 335/17 |
| 4,043,351 | 8/1977 | Durling | 137/554 |
| 4,183,467 | 1/1980 | Sheraton et al. | 137/554 X |
| 4,227,547 | 10/1980 | Cameron | 137/554 |

Primary Examiner—Arnold Rosenthal
Attorney, Agent, or Firm—Hosier, Niro & Daleiden

[57] ABSTRACT

A position indicating valve is disclosed and includes a housing, a valve port through the housing, and a valve member mounted on the housing for movement toward and away from the valve port. An electrically conductive valve seat is disposed about the valve port, and an electrically conductive valve seal is disposed on the valve member for engagement with the valve seat. The electrically conductive valve seal and valve seat define engageable electrical contact means and circuit means is coupled thereto, whereby the circuit means is closed when the valve seat and valve seal are in contact with each other.

20 Claims, 2 Drawing Figures

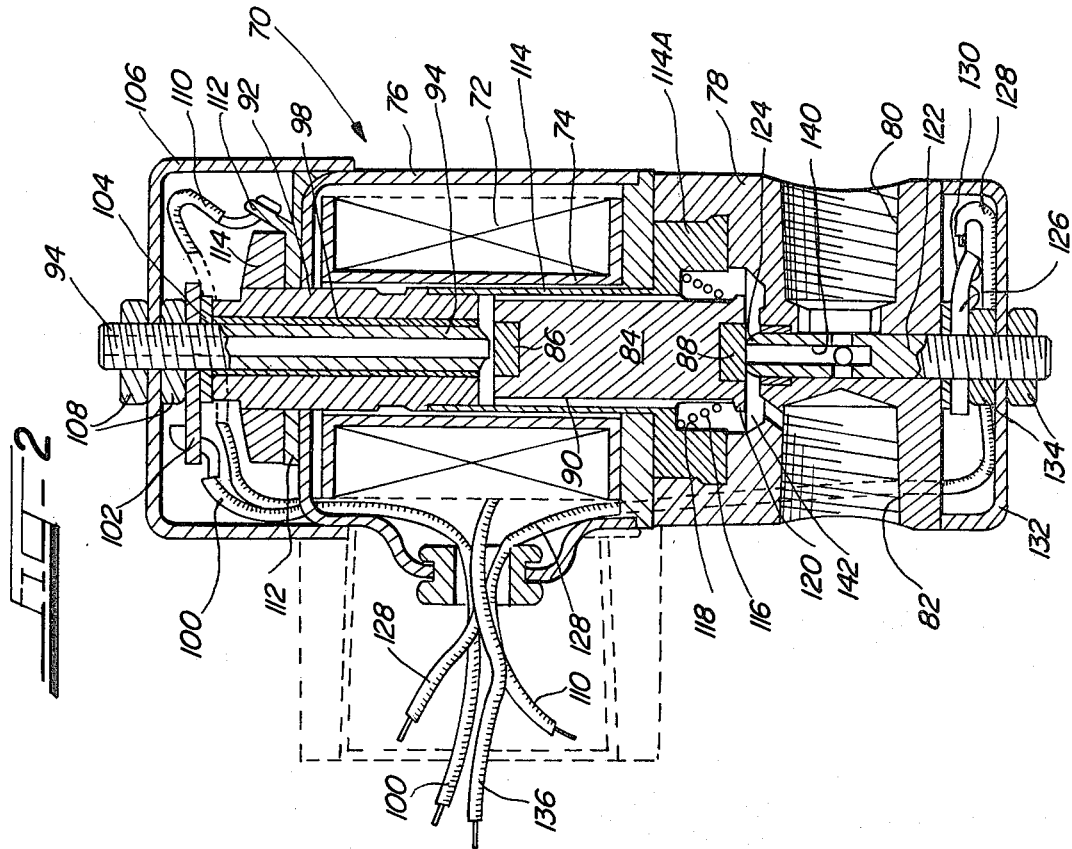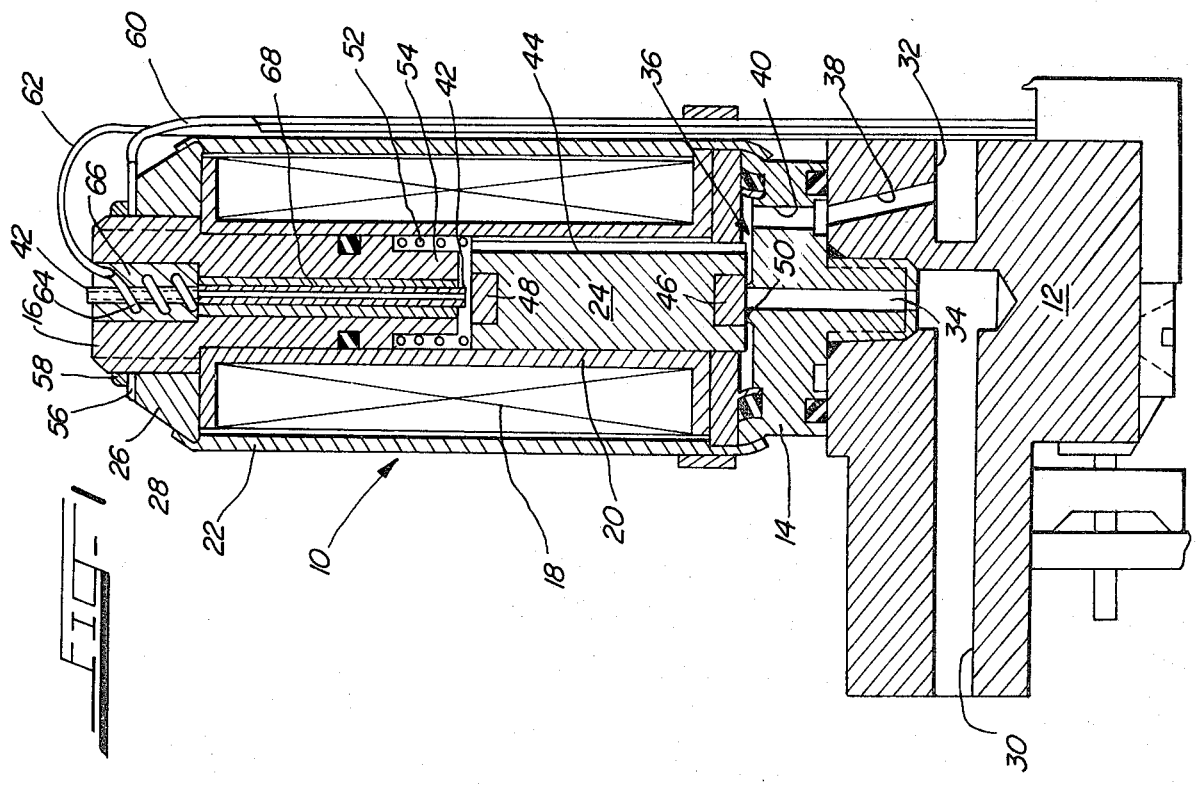

POSITION INDICATING VALVE MEANS

BACKGROUND AND SUMMARY OF THE INVENTION

This invention relates to a position indicating valve, and particularly to a new and improved means for sensing and indicating valve position.

Heretofore, various means have been employed to sense and/or indicate the position of relatively movable valve members which otherwise are hidden from view or isolated so that the condition of the valve cannot be readily determined. Such sensing or position indication of valve condition is considerably important when it is desirous to sense and indicate valve position at a location quite remote from the valve itself.

For instance, it may be required to sense and indicate valve position, at a central monitoring station, of a number of valves remotely and widely distributed throughout a system. Remote position sensing thus is required to indicate full opening and closing of valves when it is impractical to otherwise know if the valves are stuck open, shut or inbetween. Additionally, a number of valves may be assembled into a module, and it is desirous to sense and/or indicate the position of the various valves by use of printed circuitry, for instance.

Previous attempts have been made to satisfy the abovedescribed needs by providing reed or proximity switches, eddy current sensors, or the like, for providing position indicating means for valves, particularly solenoid valves. For instance, U.S. Pat. No. 4,004,258 to Kurt Arnold, dated Jan. 18, 1977, and entitled "Position Indicating Pulse Latching Solenoid", shows a valve which is operated by a solenoid plunger. A reed switch senses the momentary flux generated by the excited solenoid winding at a leakage gap near one of the valve stops and determines whether the flux imparted to the plunger by the permanent magnets has shifted with the plunger toward or away from the leakage gap to indicate plunger position. This and other position indicating means require separate switching parts which may require adjustments at various times to accommodate variances in current, valve stroke, or the like. Such devices also are somewhat ineffective when very little pull force is available within the valve. Such devices also require space requirements for properly positioning the separate switches and their respective switch contacts.

The present invention is directed to satisfying the above needs and solving the above problems by utilizing valve seat and seal members as switch contacts in a sensing circuit, thereby achieving precise and exact indication of valve position. Remote indication is readily available because the switch contacts defined by the valve seat and seal can be electrically coupled through a wide variety of circuit means to appropriate remote indicators at indication stations. With the valve seat and seal members acting as direct contacts, it is evident that extra sensing apparatus or devices are not required and there is no need to provide extra space therefore, particularly in very small valve constructions. Furthermore, absolutely no adjustments are required of the indicating means of the present invention because the valve seat and seal members themselves define the electrical contacts within the sensing circuit and, of course, they will at all times correspond to the relative contact positioning.

A principal object, therefore, of the present invention is to provide a new and improved position indicating valve.

Another object of the invention is to utilize valve seat and seal members as direct switch contacts within the valve position indicating circuit system.

In the exemplary embodiment of the invention, a position indicating valve is shown and described in which a housing has a valve port, and a valve member is mounted on the housing for movement toward and away from the valve port. An electrically conductive valve seat is disposed about the valve port, and an electrically conductive valve seal is disposed on the valve member for movement therewith into and out of contact with the conductive valve seat. Circuit means is coupled to each of the valve seat and valve seal, whereby the circuit means is closed when the seat and seal are in contact with each other.

The valve constructions shown herein are embodied in solenoid valves which include reciprocal plungers. A valve seal(s) of conductive elastomer material is embedded in one or both ends of the plunger. The conductive seals engage inlet and exhaust conduits which themselves are fabricated of conductive material. The conduits define ports and extend through the valve housing to the exterior thereof for coupling to appropriate lead means of the sensing circuit.

In order to complete a circuit to the valve seals of the plunger, the plunger itself is fabricated of conductive material, a portion of the valve housing is conductive, and a conductive spring means is sandwiched between the plunger and the conductive housing portion, with electrical lead means of the sensing circuit coupled to the conductive housing portion.

Thus, it can be seen that a new and improved construction is provided in fulfillment of the above objects and advantages of the invention. Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a sectional view through a solenoid valve incorporating the position indicating means of the present invention for giving a positive indication of valve-open condition; and FIG. 2 is a sectional view of another solenoid valve incorporating the position indicating means of the present invention for giving a positive indication of both valve-open and valve-closed positions.

DETAILED DESCRIPTION OF THE INVENTION

Referring to the drawings in greater detail, and first to FIG. 1, a solenoid valve is shown and generally indicated 10. The valve includes a lower port block 12, a lower stop block 14, and an upper stop assembly 16. A solenoid coil 18 is wound on a bobbin 20 and is disposed within an outer cylindrical shell or casing 22. A solenoid plunger 24 is reciprocally disposed within bobbin 20, between lower stop block 14 and upper stop assembly 16. Finally, a cap 26 is crimped onto the top of bobbin 20 by means of deformable flanges 28 of casing 22.

Turning next to the porting construction through valve 10 in FIG. 1, lower port block 12 has an inlet port 30 and a cylinder port 32. Cylinder port 32 may, for instance, apply pressure to a pneumatic piston. Inlet port 30 is in communication with a stop port 34 axially through lower stop block 40, and to a pressure cavity, generally designated 36 within the valve. Cylinder port 32 leads through a passageway 38 in lower block 12 to and in communication with an axially offset passageway 40 in lower stop block 14, and then in communication with pressure chamber 36.

Upper stop assembly 16 includes a central exhaust port defined by an axial tube 42. In order to provide communication between exhaust port tube 42 and pressure chamber 36, axial grooves 44 are formed in the sides of plunger 24 and extending entirely the length of the plunger between pressure chamber 36 and exhaust port tube 42.

The valving arrangement for valve 10 in FIG. 1 includes plunger 24 which has a lower valve seal 46 and an upper valve seal 48 embedded in the ends of the plunger. Lower stop block 14 defines a valve seat 50 (about port 34 in block 14) for engagement with lower valve seal 46 of the plunger. The lower end of exhaust port tube 42 defines a valve seat for engagement with upper valve seal 48 of the plunger. A coil spring 52 is positioned about a lower boss portion 54 of stop assembly 16 and is maintained under compression sandwiched between the stop assembly and plunger 24. Thus, the coil spring normally biases the plunger downwardly to the position shown in FIG. 1 which will be called the "closed" position.

In order to "open" valve 10 to apply pressure from inlet port 30 to cylinder port 32, solenoid 18 is energized which is effective to move plunger 24 upwardly from the position shown in FIG. 1 until valve seal 48 engages the lower end of exhaust port tube 42. This movement of plunger 24 closes the exhaust port and allows pressure from inlet port 30 to enter cylinder port 32 (by means of stop block port 34, pressure chamber 36, and passageways 38 and 40).

When solenoid 18 is de-energized, plunger 24 will return to the "closed" position shown in FIG. 1 under the biasing influence of spring 52. This shuts off inlet port 30 by lower valve seal 46 engaging valve seat 50. In this "closed" position, pressure in cylinder port 32 is exhausted past plunger 24 and into and through exhaust port tube 42.

The position indicating means of the present invention in relation to valve 10 in FIG. 1 now will be described. In particular, upper valve seal 48 is fabricated of a conductive elastomer material. Plunger 24 is fabricated of electrically conductive material and is electrically isolated by fabricating bobbin 20 and lower stop block 14 of non-conductive material. Upper stop assembly (block) 16 is fabricated of conductive material and coil spring 52, which is sandwiched between the upper stop assembly and conductive plunger 24, also is conductive. A conductive ring 56 is clamped about upper stop assembly 16 by a lock nut 58. A lead wire 60 from an appropriate indicating means or station is electrically connected to conductive ring 56. Thus, it can be seen that an electrical circuit is established between lead 60 and upper valve seal 48, through conductive ring 56, upper stop assembly 16, coil spring 52, and plunger 24, all of which are fabricated of electrically conductive material.

A second lead wire 62, from an appropriate indicating means or station, has a central core 64 wrapped about exhaust port tube 42 at the upper end thereof. Exhaust port tube 42 is fabricated of conductive material and, since its lower end defines the valve seat for plunger valve seal 48, it can be seen that valve seal 48 and the lower end of exhaust port tube 42 (i.e the valve seat) define switch contacts for opening and closing a circuit through lead wires 60 and 62 to the appropriate indicating means.

It should be noted that a non-conductive epoxy 66 surrounds conductive core 64 at the top end of exhaust port tube 44; and an insulating sleeve 68 surrounds conductive exhaust port tube 42 so as to electrically isolate the exhaust port tube from upper stop assembly 16 which itself forms part of the circuit means to plunger valve seal 48.

Thus, with the porting, valving and electrical structural combination shown and described in relation to valve 10 of FIG. 1, when solenoid 18 is energized to "open" the valve to apply pressure from inlet port 30 to cylinder port 32, plunger valve seal 48 will make contact with the lower end of exhaust port tube 42 and thereby close the circuit means through lead wires 60 and 62 to the appropriate indicating means or station which may be quite remote from the valve itself. No extra components are required to fabricate a separate indicating switch as has been heretofore required, and no adjustments are necessary for the switch contacts, because valve seat 42 and valve seal 48 themselves act as switch contacts.

Turning now to FIG. 2, another form of solenoid valve, generally designated 70, is shown and includes valve contact means for facilitating the positive indication of both "open" and "closed" positions of the valve. To this end, a solenoid winding 72 is provided on a bobbin 74. An insulating casing 76 surrounds the solenoid coil and provides a housing therefore. The solenoid coil seats on top of a lower port block 78 having an inlet port 80 and a cylinder port 82. A plunger 84 is disposed reciprocally within solenoid 72 and includes an upper valve seal 86 and a lower valve seal 88. Both of these valve seals 86, 88 are fabricated of conductive elastomer material, and the plunger 84 itself is conductive. As with valve 10 of FIG. 1, plunger 84 has a plurality of axial grooves 90 on the exterior thereof for defining pneumatic passageways past the plunger. Lower port block 78 is non-conductive.

As with valve 10 of FIG. 1, valve 70 of FIG. 2 includes an upper stop assembly 92 of conductive material, a conductive exhaust port tube 94 defining a valve seat 96 at the lower end thereof, and an insulating sleeve 98 between stop assembly 92 and exhaust port tube 94. A lead wire 100 is connected to a conductive ring 102 which is in electrical engagement with conductive exhaust port tube 94. An insulating washer 104 is disposed between conductive ring 102 and conductive exhaust port tube 94 to electrically isolate the conductive ring from upper stop assembly 92.

An upper cup-shaped cap 106 is secured to the upper end of exhaust port tube 94 by a pair of nuts 108 threaded onto the upper end of the exhaust port tube. This cap protects the electrical components and leads therewithin.

An electrical circuit is established to upper valve seat 86 of conductive plunger 84 by means of a lead wire 110 electrically connected to a conductive ring 112 held in engagement with upper stop assembly 92 by means of an enlarged nut 114. As with valve 10 in FIG. 1, upper stop assembly 92 is conductive, and a cylindrical conductive member 114 protrudes downwardly therefrom and terminates in an enlarged lower portion 114A. Conductive plunger 84 is reciprocally movable within cylindrical member 114. A conductive coil spring 116 is disposed within an inner recessed area 118 of the lower enlarged portion 114A of cylindrical member 114. The coil spring is in engagement with conductive plunger 84 and abuts against an annular flange 120 at the lower end thereof. Thus, it can be seen that an electrical circuit is established through lead wire 110, conductive ring 112, upper stop assembly 92, cylindrical member 114, conductive coil spring 116, and to conductive plunger 84 which has upper conductive seal 86 embedded therein. In this manner, valve seal 86 and valve seat 96 at the lower end of stop assembly 92 form switch contacts to facilitate indicating valve position, similar to valve 10 of FIG. 1.

However, valve 70 of FIG. 2 has a lower valve stop 122 which forms a valve seat 124 at the upper end thereof for engagement by lower valve seal 88 of plunger 84. Valve stop 122 and valve seat 124 are conductive and a conductive ring 126 surrounds the lower end of valve stop 122. A lead wire 128 has a conductive core 130 electrically connected to conductive ring 126, the lead wire being coupled to an appropriate indicating means or station. A lower cap 132 is secured by a pair of nuts 134 to the lower end of valve stop 122 for purposes of protecting lead wire 128 and conductive ring 126 therewithin. Lastly, lead means 136 is coupled to solenoid winding 72 for energizing the winding.

The pressure porting between inlet 80 and cylinder port 82 are somewhat similar to that of valve 10 in FIG. 1. In particular, with plunger 84 in the position shown in FIG. 2, plunger valve seal 88 closes a port 140 in the lower valve stop 122. Thus, in this position, the solenoid is de-energized and pressure in cylinder port 82 is exhausted through grooves 90 alongside plunger 84 and out through exhaust port tube 94. Conductive coil 116 maintains plunger 84 in this position while the solenoid is de-energized. With valve seal 88 in engagement with valve seat 124, those electrical contacts are closed and a circuit is closed to an appropriate indicating means or station for indicating a valve "closed" position.

On energizing solenoid 72, plunger 84 is moved upwardly until valve seal 86 engages valve seat 96 of exhaust port tube 94. This closes the exhaust port, and pressure is applied to cylinder port 82 from inlet 80 through port 140 and a pressure chamber 142. With the plunger moved upwardly so that valve seal 86 engages valve seat 96, the contact means defined by this seal and seat closes a circuit through lead wires 100 and 110 to an appropriate indicating means or station to indicate a valve "open" position.

It should be understood that in the claims and description of either valves 10 or 70 of FIG. 1 or 2, respectively, the term "housing" is intended to encompass all of the port blocks, valve stop assemblies, casings, caps, and other related components which define the various ports through the solenoid valves disclosed herein. Obviously, many other arrangements of components can be utilized to provide various valving and porting configurations in accordance with the present invention which utilizes the valve seats and valve seals as direct switch contacts to facilitate position indication of the valve.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:
1. A position indicating valve, comprising:
 a housing;
 a movable member reciprocally mounted in said housing;
 engageable valve seal means and valve stop means, one of said means being on said housing and the other said means being on said movable member for relative movement into and out of engagement between closed and open positions;
 said valve seal means and said valve stop means being fabricated of electrically conductive material to define engageable electrical contact means, and one of said valve seal means and said valve stop means being fabricated of a conductive elastomer material to insure complete valve closing; and
 circuit means coupled to each said valve seal means and said valve stop means whereby said circuit means is closed when said valve seal means and said valve stop means are in contact with each other.

2. The position indicating valve of claim 1, wherein said valve stop means includes a conductive member extending through said housing for coupling to said circuit means.

3. The position indicating valve of claim 1, wherein said movable member comprises a plunger having said valve seal means thereon, said plunger being electrically conductive and forming part of the circuit means to said valve seal means.

4. The position indicating valve of claim 3, including spring means engageable with said plunger to bias the plunger toward one said open and closed positions, said spring means being electrically conductive and forming part of the circuit means to said valve seat means.

5. The position indicating valve of claim 4, wherein said spring means electrically engages a conductive portion of said housing forming part of the circuit means to said valve seal means.

6. The position indicating valve of claim 5, including electrical lead means connected to said conductive housing portion.

7. The position indicating valve of claim 5, wherein said valve stop means includes a conductive member extending through and electrically insulated from said conductive housing portion for connection to said circuit means.

8. The position indicating valve of claim 7, wherein said conductive spring means is sandwiched between said conductive plunger and said conductive housing portion.

9. The position indicating valve of claim 7, wherein said conductive member comprises a tube forming a passageway for said valve.

10. A position indicating valve, comprising:
 a housing having a pair of conductive valve stops thereon;

a movable member reciprocally mounted in said housing and having a pair of complementary valve seals thereon for alternate engagement with said pair of conductive valve stops on said housing in response to movement of said movable member relative to said housing; and circuit means coupled to each of said valve seals and said valve stops whereby said circuit means is closed in different modes depending on which said valve seal is in engagement with which said valve stop.

11. The position indicating valve of claim 10, wherein said movable member comprises a plunger with said valve seals on opposite ends thereof.

12. The position indicating valve of claim 11, wherein said plunger forms part of a solenoid valve, with a solenoid winding on said housing surrounding said plunger.

13. A position indicating valve, comprising:
a housing;
a valve port through said housing;
an electrically conductive valve seat about said valve port;
a valve member including an electrically conductive valve seal engageable with said valve seat, said valve member being mounted on said housing for movement toward and away from said valve port to bring said conductive valve seal into and out of contact with said conductive valve seat;
one of said valve seat and said valve seal being fabricated of a conductive elastomer material to insure complete valve closing; and
circuit means coupled to each said valve seat and said valve seal whereby said circuit means is closed when said valve seat and valve seal are in contact with each other.

14. The position indicating valve of claim 13, wherein said movable member comprises a plunger having said valve seal means thereon, said plunger being electrically conductive and forming part of the circuit means to said valve seal means.

15. The position indicating valve of claim 14, including spring means engageable with said plunger to bias the plunger toward one said open and closed positions, said spring means being electrically conductive and forming part of the circuit means to said valve seat means.

16. The position indicating valve of claim 15, wherein said spring means electrically engages a conductive portion of said housing forming part of the circuit means to said valve seal means.

17. The position indicating valve of claim 16, including electrical lead means connected to said conductive housing portion.

18. The position indicating valve of claim 16, wherein said valve port comprises a conductive member extending through and electrically insulated from said conductive housing portion for connection to said circuit means.

19. The position indicating valve of claim 18, wherein said conductive spring means is sandwiched between said conductive plunger and said conductive housing portion.

20. The position indicating valve of claim 13, wherein said valve port and valve seat are formed by a conductive conduit member extending through said housing for coupling to said circuit means.

* * * * *